(12) United States Patent
Son

(10) Patent No.: US 11,907,011 B2
(45) Date of Patent: Feb. 20, 2024

(54) DISPLAY DEVICE

(71) Applicant: LG ELECTRONICS INC., Seoul (KR)

(72) Inventor: Chulmin Son, Seoul (KR)

(73) Assignee: LG ELECTRONICS, INC., Seoul (KR)

( * ) Notice: Subject to any disclaimer, the term of this patent is extended or adjusted under 35 U.S.C. 154(b) by 1109 days.

(21) Appl. No.: 16/277,651

(22) Filed: Feb. 15, 2019

(65) Prior Publication Data

US 2019/0310683 A1 Oct. 10, 2019

(30) Foreign Application Priority Data

Apr. 9, 2018 (KR) .................. 10-2018-0040855

(51) Int. Cl.
| | |
|---|---|
| G06F 16/9538 | (2019.01) |
| G06F 1/16 | (2006.01) |
| G06F 3/033 | (2013.01) |
| G10L 15/22 | (2006.01) |
| G06F 3/16 | (2006.01) |
| H04N 21/858 | (2011.01) |
| H04N 21/422 | (2011.01) |
| H04N 21/4722 | (2011.01) |
| H04N 21/435 | (2011.01) |
| G06F 40/134 | (2020.01) |
| G06F 40/194 | (2020.01) |
| G06F 40/284 | (2020.01) |

(52) U.S. Cl.
CPC ............ *G06F 1/1605* (2013.01); *G06F 3/033* (2013.01); *G06F 3/167* (2013.01); *G06F 16/9538* (2019.01); *G06F 40/134* (2020.01); *G06F 40/194* (2020.01); *G06F 40/284* (2020.01); *G10L 15/22* (2013.01); *H04N 21/42203* (2013.01); *H04N 21/435* (2013.01); *H04N 21/4722* (2013.01); *H04N 21/8586* (2013.01)

(58) Field of Classification Search
None
See application file for complete search history.

(56) References Cited

U.S. PATENT DOCUMENTS

| | | |
|---|---|---|
| 2012/0257108 A1 | 10/2012 | Friedlander et al. |
| 2012/0257121 A1 | 10/2012 | Yeh et al. |
| (Continued) | | |

FOREIGN PATENT DOCUMENTS

| | | | |
|---|---|---|---|
| EP | 2533242 | 12/2012 | |
| WO | WO-2009120004 A2 * | 10/2009 | ............ G06F 16/00 |

OTHER PUBLICATIONS

European Patent Office Application Serial No. 19159386.2, Search Report dated May 14, 2019, 10 pages.

*Primary Examiner* — Amresh Singh
(74) *Attorney, Agent, or Firm* — LEE, HONG, DEGERMAN, KANG & WAIMEY

(57) ABSTRACT

Provided is a display device including a microphone, a display, and a controller configured to cause the display to display a webpage, search duplicate text within the webpage, cause the display to display sequential numbers each correspondingly displayed at one side of each of a plurality of contents including the searched duplicate text, and access a link corresponding to a selected one of the displayed sequential numbers in response to a voice command received via the microphone indicating the selected sequential number.

11 Claims, 17 Drawing Sheets

(56) References Cited

U.S. PATENT DOCUMENTS

| | | |
|---|---|---|
| 2012/0259639 A1 | 10/2012 | Yeh et al. |
| 2012/0260167 A1 | 10/2012 | Friedlander et al. |
| 2012/0260168 A1 | 10/2012 | Friedlander et al. |
| 2012/0260171 A1 | 10/2012 | Young et al. |
| 2012/0260172 A1 | 10/2012 | Friedlander et al. |
| 2012/0260173 A1 | 10/2012 | Friedlander et al. |
| 2012/0260212 A1 | 10/2012 | Young et al. |
| 2012/0260284 A1 | 10/2012 | Young et al. |
| 2012/0260285 A1 | 10/2012 | Young et al. |
| 2012/0260287 A1 | 10/2012 | Yeh et al. |
| 2012/0260290 A1 | 10/2012 | Friedlander et al. |
| 2012/0260293 A1 | 10/2012 | Young et al. |
| 2012/0313849 A1 | 12/2012 | Bak et al. |
| 2013/0290844 A1 | 10/2013 | Friedlander et al. |
| 2014/0002741 A1 | 1/2014 | Young et al. |
| 2014/0223273 A1 | 8/2014 | Chung |
| 2014/0325355 A1 | 10/2014 | Friedlander et al. |
| 2014/0350941 A1 | 11/2014 | Zeigler et al. |
| 2018/0091757 A1 | 3/2018 | Friedlander et al. |

* cited by examiner

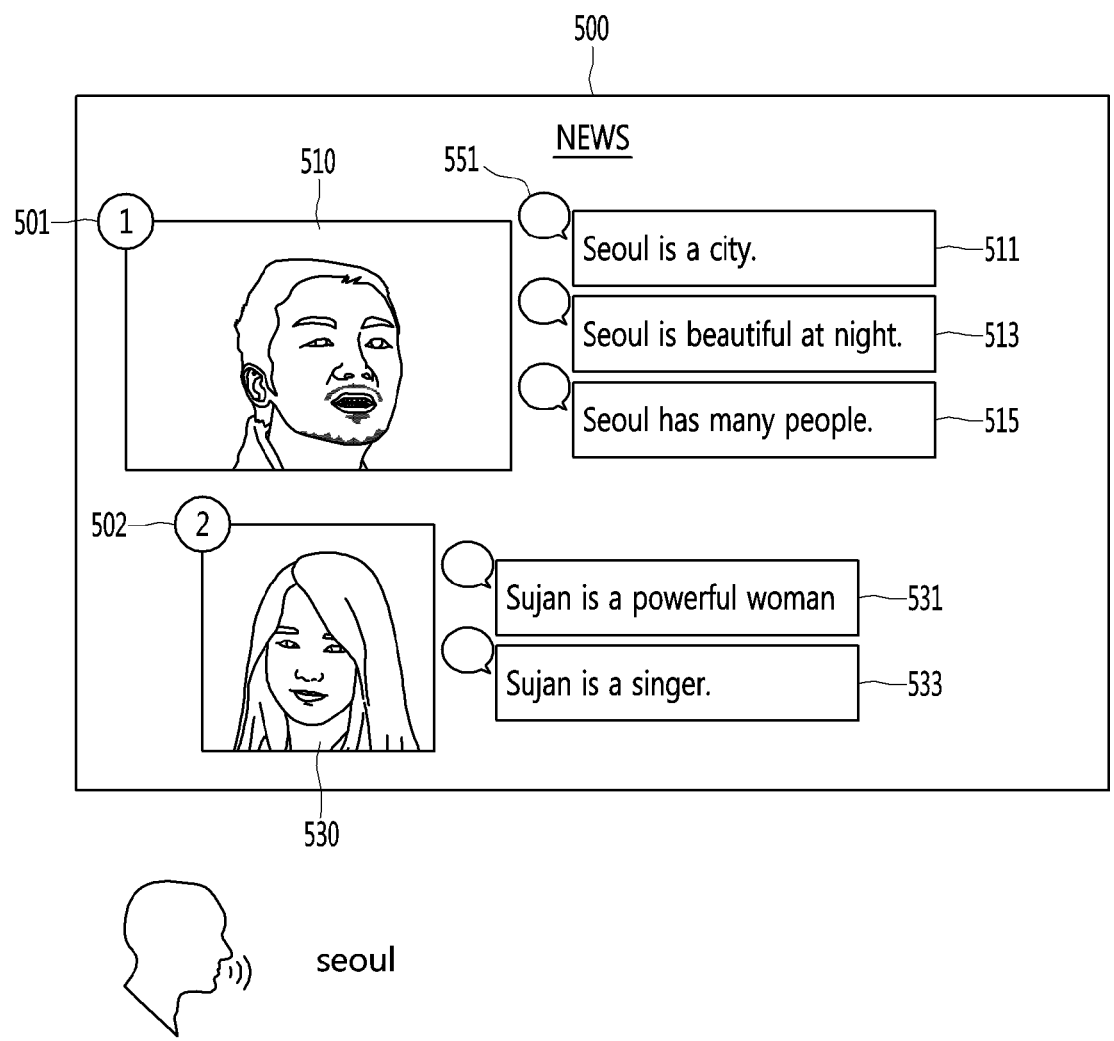

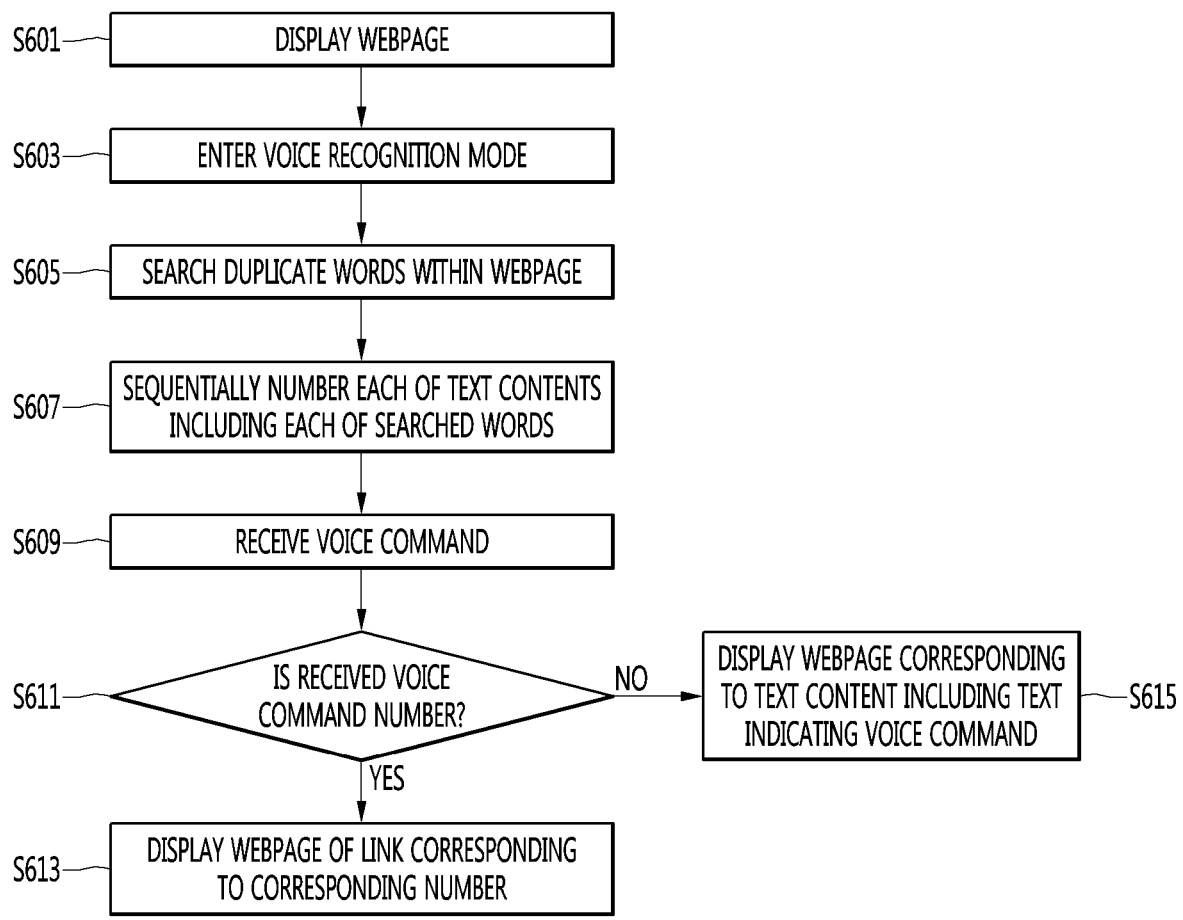

700

Seoul

'Spring Concert' at the Seoul Baekje Museum

'Spring Concert' at the Seoul Baekje Museum The Seoul Baekje MuseumSeasonal Concert was held for free at the museum itself.

900

| Token | Access address | Text content | | Number to be assigned |
|---|---|---|---|---|
| Seoul | www.seoul-1.com | Seoul is a city | → | 1 |
| | www.seoul-2.com | Seoul is beautiful at night | → | 2 |
| | www.seoul-2.com | Seoul is beautiful at night and has many places | → | Deletion object |
| Busan | www.busan.com | Busan is located adjacent sea | → | Non-existence |

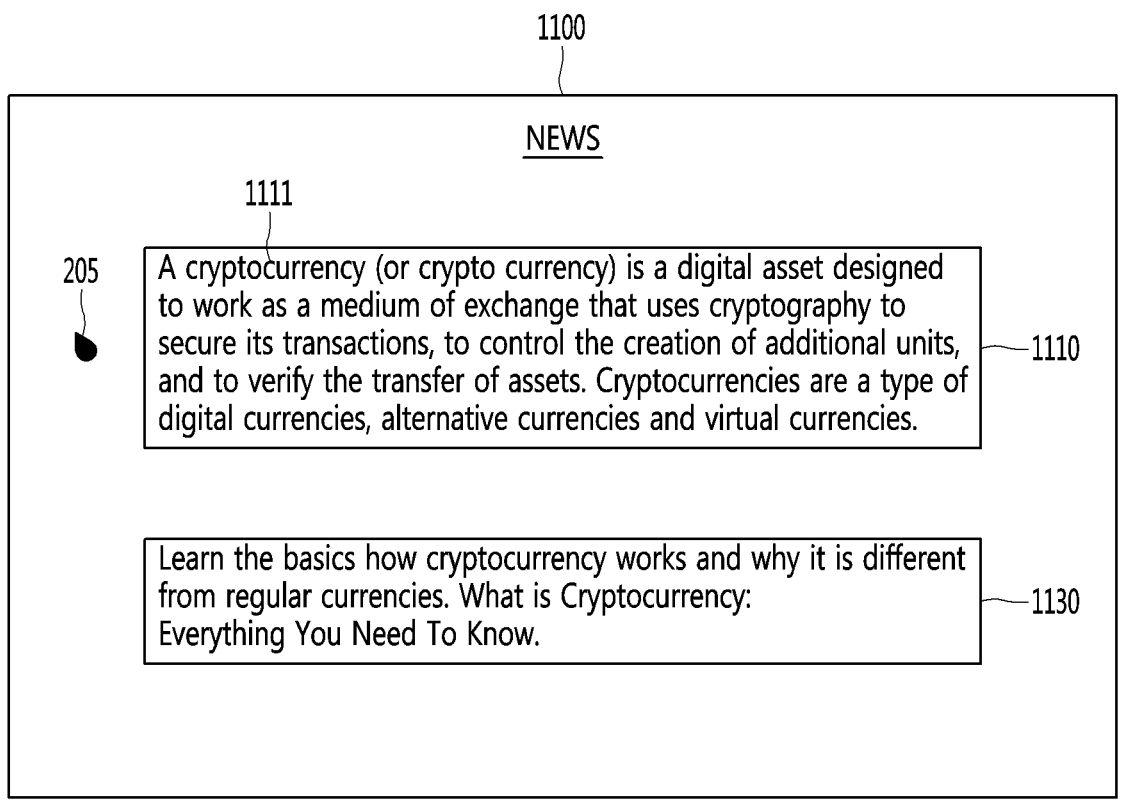

DISPLAY DEVICE

CROSS-REFERENCE TO RELATED APPLICATIONS

Pursuant to 35 U.S.C. § 119(a), this application claims the benefit of earlier filing date and right of priority to Korean Patent Application No. 10-2018-0040855, filed on Apr. 9, 2018, the contents of which are hereby incorporated by reference herein in its entirety.

BACKGROUND

The present disclosure relates to a display device, and more particularly, to a display device that is capable of recognizing a voice command of a user.

Digital TV services using wired or wireless communication network are becoming popular. Such a digital TV service may provide various services that may not be provided by the existing analog broadcasting service.

For example, in the case of IPTV (Internet Protocol Television) or smart TV service, which is a digital TV service type, it may provide bidirectionality in which a user may actively select a type of viewing program and a viewing time. IPTV and smart TV services may provide various additional services such as Internet search, home shopping, online games, etc. based on the bidirectionality.

In addition, recent TVs recognize a user's voice to provide services. However, when a plurality of text contents, each of which has a link in a webpage, include the same text, voice recognition for the text is performed firstly, and then the duplicated text contents are numbered.

However, in this case, the user has to perform additional voice recognition on the number after one voice recognition on the text.

SUMMARY

Embodiments provide a display device capable of opening a desired link with only one voice recognition even when duplicated texts exist in a webpage.

In one embodiment, a display device includes: a microphone; a display unit configured to display a webpage; and a control unit configured to search duplicated text within the webpage, sequentially display numbers on one side of each of a plurality of text contents including the searched text, receive a voice command through the microphone, and connect to a link corresponding to the number indicated by the received voice.

The control unit may be configured to extract a plurality of links based on a source code of the webpage, acquire the plurality of text contents respectively corresponding to the plurality of extracted links, and search the duplicated text from the plurality of acquired text contents.

The control unit may be configured to divide the plurality of text contents into blank units to generate a plurality of tokens and a token table in which link respectively corresponding to the plurality of tokens are associated, and assign a number to a text content corresponding to a token having two or more links by using the generated token table.

The control unit may be configured to compare the text contents corresponding to the token having the two or more links to delete the token having the same link and the link corresponding to the token from the token table.

The control unit may be configured not to assign a number to a text content corresponding to a token having less than two links.

When the received voice command indicates a text, the control unit may be configured to access a link corresponding to the text.

When an operation mode of the display device is under a voice recognition mode, the control unit may be configured to sequentially display the numbers on one side of each of the plurality of text contents including the searched text on the webpage.

The control unit may be configured to extract a paragraph tag indicating a paragraph when an anchor tag that provides a function of moving from the source code of the webpage to another webpage is not extracted, determine whether the link exists from the extracted paragraph tag, and assign a number to a text corresponding to the paragraph tag when the link exists.

The control unit may be configured to input a focus event to the text corresponding to the paragraph tag and determine whether a state change of the text corresponding to the paragraph tag occurs according to the input focus event.

The focus event may be an event for locating a pointer, which is controlled according to movement of a remote control device, on the text.

When the state change occurs in the text, the control unit may be configured to determine that the link exist in the text.

The state change may include one of a change in size and thickness of the text or a display of another text.

When an image having the link exists in the webpage, the control unit may be configured to display numbers other than the numbers respectively assigned to the plurality of text contents on the image.

When a plurality of images having the links exist in the webpage and other images overlap one image and hidden, the control unit may be configured to display a number on only a non-hidden image.

When a direction key having the link further exists in the webpage, the control unit may be configured to assign a number to the direction key.

The details of one or more embodiments are set forth in the accompanying drawings and the description below. Other features will be apparent from the description and drawings, and from the claims.

BRIEF DESCRIPTION OF THE DRAWINGS

FIGS. 5A and 5B are views for explaining a process of opening one link through voice recognition when duplicated texts exist in a webpage according to the related art.

FIG. 6 is a flowchart for explaining an operation method of a display device according to an embodiment of the present disclosure.

FIGS. 11A and 11B are views for explaining an example of assigning a number to a text content corresponding to a paragraph tag when there is no anchor tag in a source code of a webpage, and only a paragraph tag exists according to an embodiment of the present disclosure.

DETAILED DESCRIPTION OF THE EMBODIMENTS

Hereinafter, embodiments relating to the present disclosure will be described in detail with reference to the accompanying drawings. The suffixes "module" and "unit" for components used in the description below are assigned or mixed in consideration of easiness in writing the specification and do not have distinctive meanings or roles by themselves.

A display device according to an embodiment, for example, as an intelligent display device having both of the broadcast reception function and the computer assisted function, may include more convenient user-friendly interface than a handwriting input device, a touch screen or space remote control device, and the like, by adding an Internet function while fulfilling a broadcasting receiving function. With the support of a wired or wireless Internet function, the display device can connect to the Internet and computers and perform functions such as e-mail, web browsing, banking, or games. In order to perform such various functions, standardized general-purpose OS can be used.

Accordingly, since various applications are freely added or deleted on a general purpose OS kernel, a display device described herein can perform various user-friendly functions. More specifically, the display device may be, for example, a network TV, a Hybrid Broadcast Broadband TV (HBBTV), a smart TV, a light-emitting diode (LED) TV, an organic light-emitting diode (OLED) TV, and so on, and may be applied to a smartphone in some cases.

Figure 1:
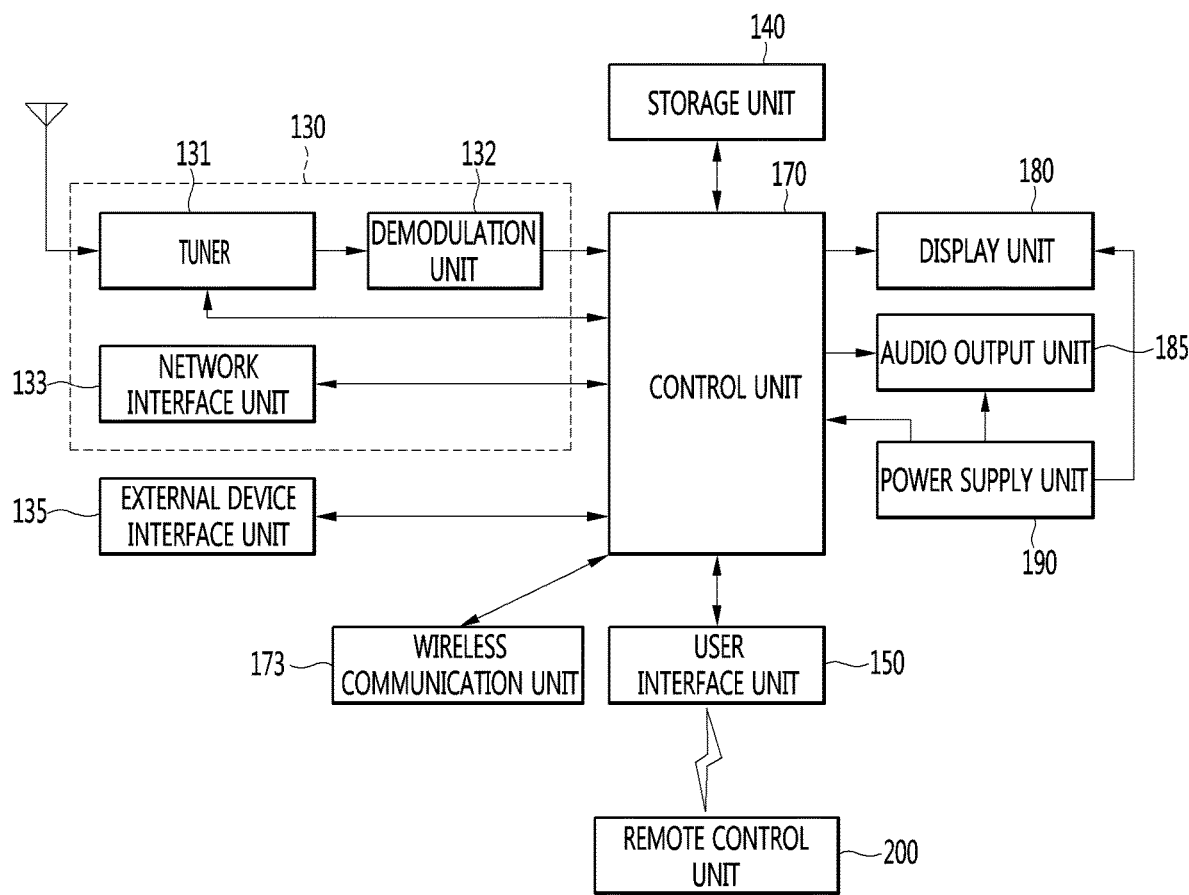
FIG. 1 is a block diagram illustrating a configuration of a display device according to an embodiment of the present disclosure.

FIG. 1 is a block diagram illustrating a configuration of a display device according to an embodiment of the present disclosure.

Referring to FIG. 1, the display device 100 may include a broadcast reception unit 130, an external device interface unit 135, a storage unit 140, a user input interface unit 150, a control unit 170, a wireless communication unit 173, a display unit 180, an audio output unit 185, and a power supply unit 190.

The broadcast reception unit 130 may include a tuner 131, a demodulation unit 132, and a network interface unit 133.

The tuner 131 may select a specific broadcast channel according to a channel selection command. The tuner 131 may receive broadcast signals for the selected specific broadcast channel.

The demodulation unit 132 may divide the received broadcast signals into video signals, audio signals, and broadcast program related data signals and restore the divided video signals, audio signals, and data signals to an output available form.

The external device interface unit 135 may receive an application or an application list of an adjacent external device and transfer the application or the application list to the control unit 170 or the storage unit 140.

The external device interface unit 135 may provide a connection path between the display device 100 and an external device. The external device interface unit 135 may receive at least one of image and audio output from an external device that is wirelessly or wiredly connected to the display device 100 and deliver it to the control unit 170. The external device interface unit 135 may include a plurality of external input terminals. The plurality of external input terminals may include an RGB terminal, at least one High Definition Multimedia Interface (HDMI) terminal, and a component terminal.

An image signal of an external device input through the external device interface unit 135 may be output through the display unit 180. A sound signal of an external device input through the external device interface unit 135 may be output through the audio output unit 185.

An external device connectable to the external device interface unit 135 may be one of a set-top box, a Blu-ray player, a DVD player, a game console, a sound bar, a smartphone, a PC, a USB memory, and a home theater system, but these are just exemplary.

The network interface unit 133 may provide an interface for connecting the display device 100 to a wired/wireless network including the Internet network. The network interface unit 133 may transmit or receive data to or from another user or another electronic device through an accessed network or another network linked to the accessed network.

Additionally, the network interface unit 133 may transmit a part of content data stored in the display device 100 to a user or an electronic device selected from other users or other electronic devices preregistered in the display device 100.

The network interface unit 133 may access a predetermined webpage through an accessed network or another network linked to the accessed network. That is, the network interface unit 133 may access the predetermined webpage through the network and transmit or receive data to or from a corresponding server.

The network interface unit 133 may receive content or data provided by a content provider or a network operator. That is, the network interface unit 133 may receive content (e.g., movies, advertisements, games, VOD, broadcast signals, etc.) and content-related information provided by the content provider or the network operator through the network.

Additionally, the network interface unit 133 may receive update information and update files of firmware provided by the network operator and may transmit data to the Internet or content provider or the network operator.

The network interface unit 133 may select and receive a desired application among applications, which are open to the public, through the network.

The storage unit 140 may store a program for signal processing and control in the control unit 170 and may store signal-processed image, voice, or data signals.

Additionally, the storage unit 140 may perform a function for temporarily storing images, voices, or data signals input from the external device interface unit 135 or the network interface unit 133 and may store information on a predetermined image through a channel memory function.

The storage unit 140 may store an application or an application list input from the external device interface unit 135 or the network interface unit 133.

The display device 100 may play content files (e.g., moving image files, still image files, music files, document files, application files, etc.) stored in the storage unit 140 so as to provide the content files to the user.

The user input interface unit 150 may transfer signals input by the user to the control unit 170 or may transfer signals from the control unit 170 to the user. For example, the user input interface unit 150 may process control signals for power on/off, channel selection, screen setting, or the like, which is received from the remote control device 200, or transmit the control signals from the control unit 170 to the remote control device 200, according to various communication schemes such as Bluetooth scheme, an Ultra Wideband (WB) scheme, a ZigBee scheme, a Radio Frequency (RF) communication scheme, or an infrared (IR) communication scheme.

Additionally, the user input interface unit 150 may transfer, to the control unit 170, control signals input from local keys (not shown) such as a power key, a channel key, a volume key, and a setting key.

Image signals that are image-processed by the control unit 170 may be input to the display unit 180 and displayed as an image corresponding to the image signals. Additionally, image signals that are image-processed by the control unit 170 may be input to an external output device through the external device interface unit 135.

Voice signals that are processed by the control unit 170 may be output to the audio output unit 185. Additionally, voice signals that are processed by the control unit 170 may be input to an external output device through the external device interface unit 135.

In addition, the control unit 170 may control overall operations of the display device 100.

Additionally, the control unit 170 may control the display device 100 by a user command or internal program input through the user input interface unit 150 and may access the network to download an application or an application list desired by the user into the display device 100.

The control unit 170 may output channel information selected by the user through the display unit 180 or the audio output unit 185 together with the processed images or voice signals.

Additionally, the control unit 170 may output image signals or voice signals, which are input from the external device (e.g., a camera or a camcorder) through the external device interface unit 135, to the display unit 180 or the audio output unit 185 according to an external device image playback command received through the user input interface unit 150.

On the other hand, the control unit 170 may control the display unit 180 to display images. For example, the control unit 170 may control the display unit 180 to display broadcast images input through the tuner 131, external input images input through the external device interface unit 135, images input through the network interface unit, or images stored in the storage unit 140. In this case, an image displayed on the display unit 180 may be a still image or video, and may be a 2D image or a 3D image.

Additionally, the control unit 170 may perform control to play content stored in the video display device 100, received broadcast content, or external input content input from the outside. The content may be in various formats, such as broadcast images, external input images, audio files, still images, accessed web screens, and document files.

The wireless communication unit 173 may perform a wired or wireless communication with an external electronic device. The wireless communication unit 173 may perform short-range communication with an external device. To this end, the wireless communication unit 173 can support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The wireless communication unit 173 may support wireless communication between the display device 100 and a wireless communication system, between the display device 100 and another display device 100, or between networks including the display device 100 and another display device 100 (or an external server) through wireless area networks. The wireless area networks may be wireless personal area networks.

Herein, the other display device 100 may be a mobile terminal such as a wearable device (for example, a smart watch, a smart glass, and a head mounted display (HMD)) or a smartphone, which is capable of exchanging data (or interworking) with the display device 100. The wireless communication unit 173 can detect (or recognize) a communicable wearable device around the display device 100. Furthermore, if the detected wearable device is a device authenticated to communicate with the display device 100, the control unit 170 may transmit at least part of data processed in the display device 100 to the wearable device through the wireless communication unit 173. Accordingly, a user of the wearable device may use the data processed in the display device 100 through the wearable device.

The display unit 180 may convert image signals, data signals, or on-screen display (OSD) signals, which are processed in the control unit 170, or images signals or data signals, which are received in the external device interface unit 135, into R, G, and B signals to generate driving signals.

Furthermore, the display device 100 shown in FIG. 1 is just one embodiment of the present disclosure, and thus, some of the components shown in FIG. 1 may be integrated, added, or omitted according to the specification of the actually implemented display device 100.

That is, if necessary, two or more elements may be integrated into one element, or one element may be divided into two or more elements. Additionally, a function performed by each block is provided for describing the embodiments of the present disclosure, and a specific operation or device thereof does not limit the scope of the present disclosure.

According to another embodiment of the present disclosure, the display device 100 may not include the tuner 131 and the demodulation unit 132, unlike that illustrated in FIG. 1, and may receive images through the network interface unit 133 or the external device interface unit 135 and play the received images.

For example, the display device 100 may be divided into an image processing device such as a set-top box for receiving broadcast signals or content according to various network services, and a content playback device for playing content input from the image processing device.

In this case, an operating method of a display device according to an embodiment of the present disclosure, as described below, may be performed by one of the display device 100 described with reference to FIG. 1, an image processing device such as the separated set-top box, and a content playback device including the display unit 180 and the audio output unit 185.

Next, the remote control device according to an embodiment of the present disclosure will be described with reference to FIGS. 2 and 3.

Figure 2:
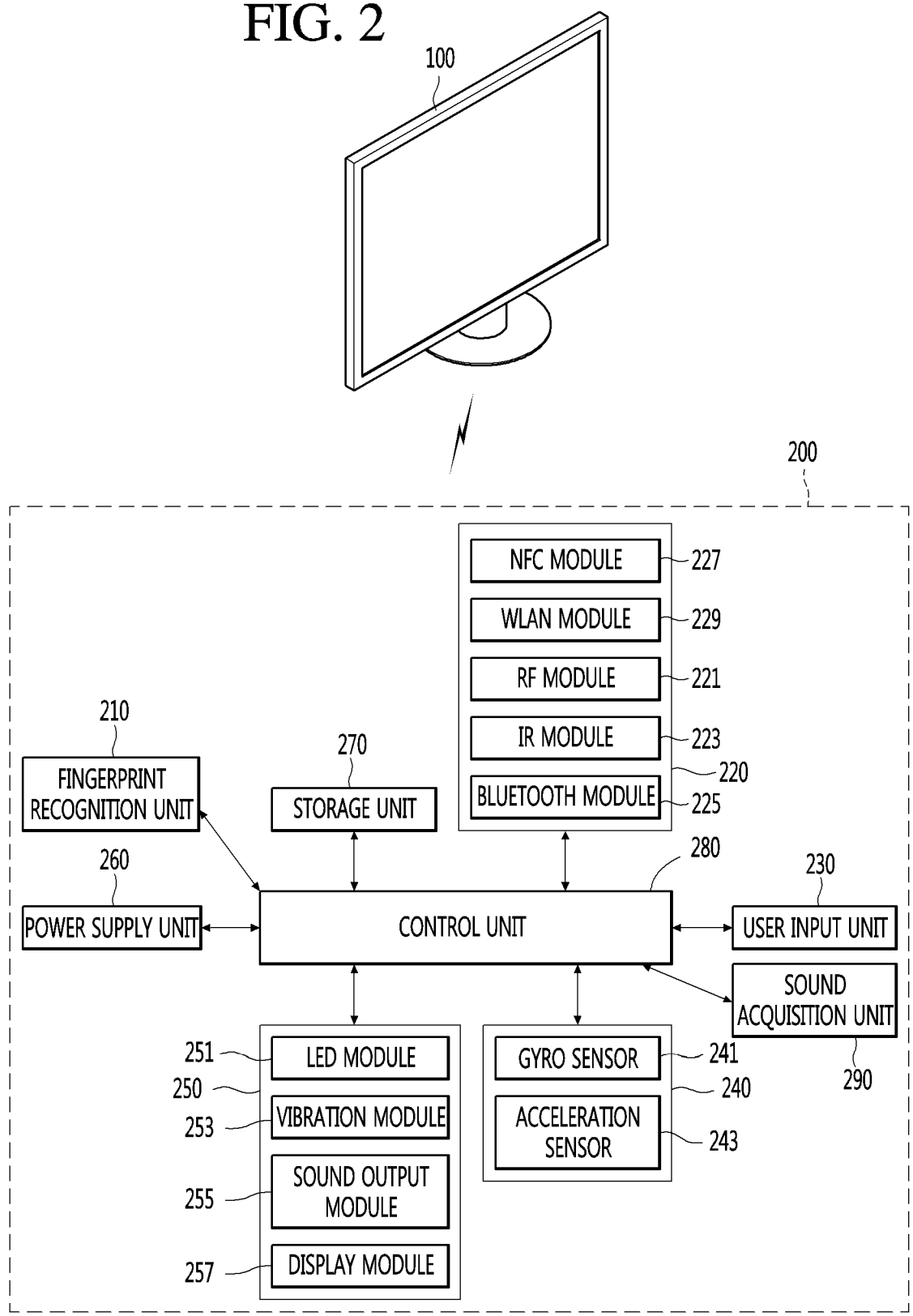
FIG. 2 is a block diagram of a remote control device according to an embodiment of the present disclosure.
Figure 3:
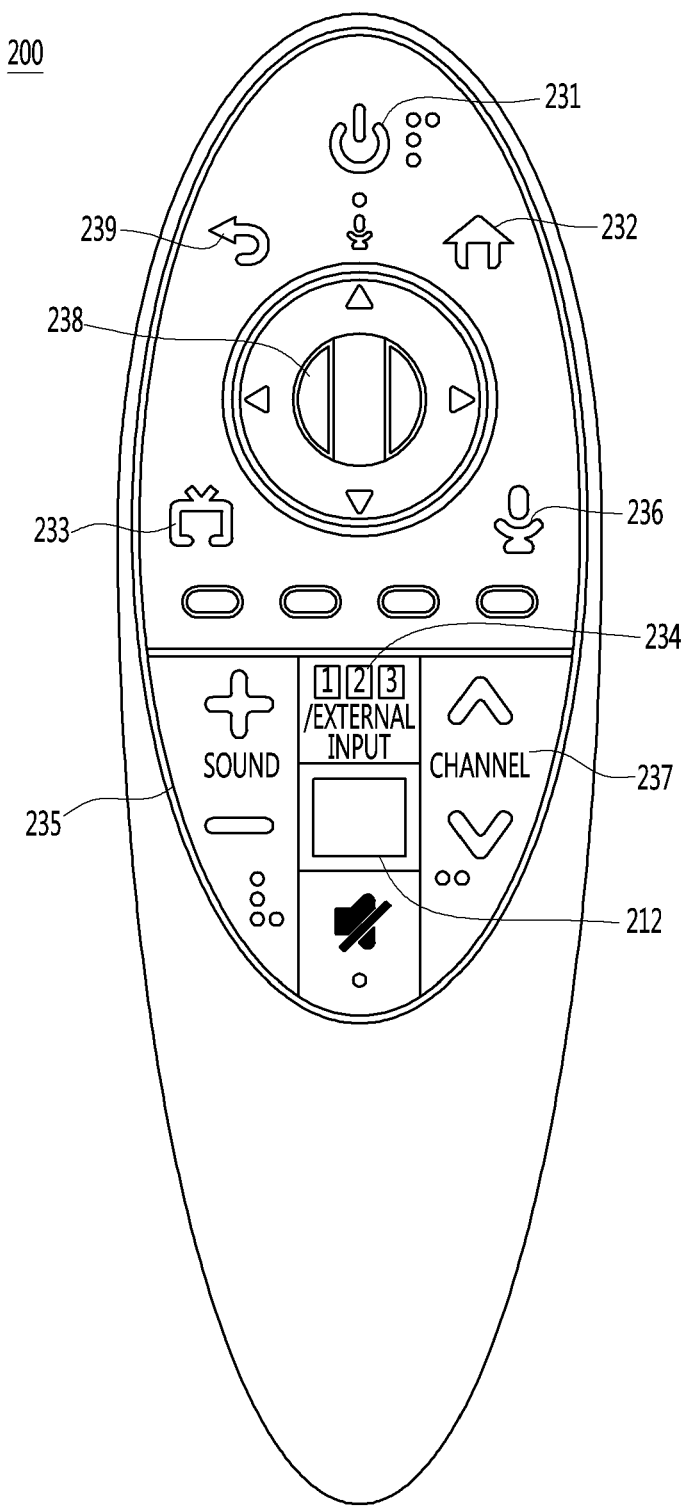
FIG. 3 illustrates an actual configuration example of the remote control device according to an embodiment of the present disclosure.

FIG. 2 is a block diagram of the remote control device according to an embodiment of the present disclosure, and FIG. 3 illustrates an actual configuration example of the remote control device according to an embodiment of the present disclosure.

First, referring to FIG. 2, the remote control device 200 may include a fingerprint recognition unit 210, a wireless communication unit 220, a user input unit 230, a sensor unit 240, an output unit 250, a power supply unit 260, a storage unit 270, a control unit 280, and a sound acquisition unit 290. Referring to FIG. 2, the Bluetooth Module 225 transmits/receives signals to/from any one of the display devices according to the above-mentioned embodiments of the present disclosure.

The remote control device 200 may include an RF module 221 for transmitting/receiving signals to/from the display device 100 according to an RF communication standard and an IR module 223 for transmitting/receiving signals to/from the display device 100 according to an IR communication standard. Additionally, the remote control device 200 may include a Bluetooth module 225 for transmitting/receiving signals to/from the display device 100 according to a Bluetooth communication standard. Additionally, the remote control device 200 may include a Near Field Communication (NFC) module 227 for transmitting/receiving signals to/from the display device 100 according to an NFC communication standard and a WLAN module 229 for transmitting/receiving signals to/from the display device 100 according to a Wireless LAN (WLAN) communication standard.

Additionally, the remote control device 200 may transmit signals containing information on a movement of the remote control device 200 to the display device 100 through the wireless communication unit 220.

On the other hand, the remote control device 200 may receive signals transmitted from the display device 100 through the RF module 221 and, if necessary, may transmit a command on power on/off, channel change, and volume change to the display device 100 through the IR module 223.

The user input unit 230 may include a keypad, a button, a touch pad, or a touch screen. A user may manipulate the user input unit 230 to input a command related to the video display device 100 to the remote control device 200. If the user input unit 230 includes a hard key button, a user may push the hard key button to input a command related to the display device 100 to the remote control device 200. Details thereof will be described below with reference to FIG. 3.

Referring to FIG. 3, the remote control device 200 may include a plurality of buttons. The plurality of buttons may include a fingerprint recognition button 212, a power button 231, a home button 232, a live button 233, an external input button 234, a volume control button 235, a voice recognition button 236, a channel change button 237, a check button 238, and a back button 239.

The fingerprint recognition button 212 may be a button for recognizing a user's fingerprint. According to an embodiment, the fingerprint recognition button 212 may perform a push operation and receive a push operation and a fingerprint recognition operation. The power button 231 may be a button for turning on/off the power of the display device 100. The home button 232 may be a button for moving to the home screen of the display device 100. The live button 233 may be a button for displaying live broadcast programs. The external input button 234 may be a button for receiving an external input connected to the display device 100. The volume control button 235 may be a button for adjusting a volume output from the display device 100. The voice recognition button 236 may be a button for receiving a user's voice and recognizing the received voice. The channel change button 237 may be a button for receiving broadcast signals of a specific broadcast channel. The check button 238 may be a button for selecting a specific function and the back button 239 can be a button for returning to a previous screen.

Referring again to FIG. 2, if the user input unit 230 includes a touch screen, a user may touch a soft key of the touch screen to input a command related to the display device 100 to the remote control device 200. Additionally, the user input unit 230 may include various types of input means that can be manipulated by a user, for example, a scroll key and a jog key, and this embodiment does not limit the scope of the present disclosure.

The sensor unit 240 may include a gyro sensor 241 or an acceleration sensor 243, and the gyro sensor 241 may sense information on a movement of the remote control device 200.

For example, the gyro sensor 241 may sense information on an operation of the remote control device 200 on the basis of x, y, and z axes, and the acceleration sensor 243 may sense information on a moving speed of the remote control device 200. Moreover, the remote control device 200 may further include a distance measurement sensor and sense a distance to the display unit 180 of the display device 100.

The output unit 250 may output image or voice signals in response to manipulation of the user input unit 230 or image or voice signals corresponding to signals transmitted from the display device 100. A user can recognize whether the user input unit 230 is manipulated or the video display device 100 is controlled through the output unit 250.

For example, the output unit 250 may include an LED module 251 for flashing, a vibration module 253 for generating vibration, a sound output module 255 for outputting sound, or a display module 257 for outputting an image, if the user input unit 230 is manipulated or signals are transmitted/received to/from the display device 100 through the wireless communication unit 220.

Additionally, the power supply unit 260 supplies power to the remote control device 200 and, if the remote control device 200 does not move for a predetermined time, stops supplying power, so that power waste can be reduced. The power supply unit 260 may resume the power supply if a predetermined key provided at the remote control device 200 is manipulated.

The storage unit 270 may store various types of programs and application data necessary for control or operation of the remote control device 200. If the remote control device 200 transmits/receives signals wirelessly through the display device 100 and the RF module 221, the remote control device 200 and the display device 100 transmit/receive signals through a predetermined frequency band.

The control unit 280 of the remote control device 200 may store, in the storage unit 270, information on a frequency band for transmitting/receiving signals wirelessly to/from the video display device 100 paired with the remote control device 200 and refer to the information.

The control unit 280 controls general matters related to control of the remote control device 200. The control unit 280 may transmit a signal corresponding to a predetermined key manipulation of the user input unit 230 or a signal corresponding to a movement of the remote control device 200 sensed by the sensor unit 240 to the display device 100 through the wireless communication unit 220.

Additionally, the sound acquisition unit 290 of the remote control device 200 may obtain voice.

The sound acquisition unit 290 may include at least one microphone 291 and acquire voice through the microphone 291.

Figure 4:
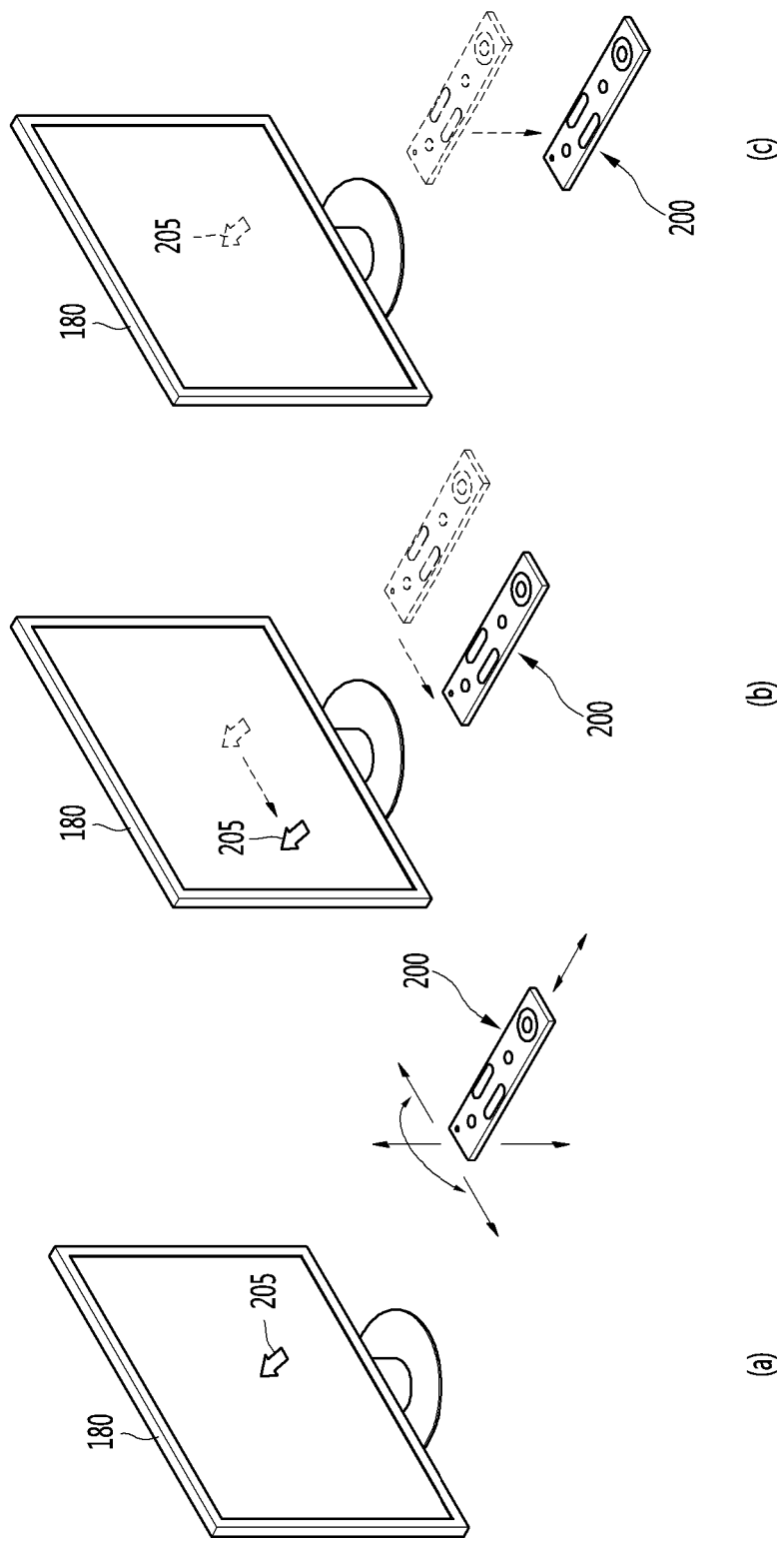
FIG. 4 illustrates an example of utilizing the remote control device according to an embodiment of the present disclosure.

Next, FIG. 4 is described.

FIG. 4 illustrates an example of utilizing the remote control device according to an embodiment of the present disclosure.

FIG. 4(*a*) illustrates an example in which a pointer 205 corresponding to the remote control device 200 is displayed on the display unit 180.

A user can move or rotate the remote control device 200 vertically or horizontally. The pointer 205 displayed on the display unit 180 of the display device 100 corresponds to a movement of the remote control device 200. Since the corresponding pointer 205 is moved and displayed according to a movement on a 3D space as show in the drawing, the remote control device 200 may also be referred to as a spatial remote control device.

FIG. 4(*b*) illustrates an example in which if a user moves the remote control device 200 to the left, the pointer 205 displayed on the display unit 180 of the display device 100 is also moved to the left according to the movement of the remote control device 200.

Information on the movement of the remote control device 200 detected through a sensor of the remote control device 200 is transmitted to the display device 100. The display device 100 may calculate the coordinates of the pointer 205 from the information on the movement of the remote control device 200. The display device 100 may display the pointer 205 to match the calculated coordinates.

FIG. 4(*c*) illustrates an example in which while a specific button in the remote control device 200 is pressed, a user moves the remote control device 200 away from the display unit 180. Due to this, a selection area in the display unit 180 corresponding to the pointer 205 may be zoomed in and displayed in an enlarged size.

On the contrary, if a user moves the remote control device 200 closer to the display unit 180, a selection area in the display unit 180 corresponding to the pointer 205 may be zoomed out and displayed in a reduced size.

On the other hand, if the remote control device 200 is moved away from the display unit 180, a selection area may be zoomed out and if the remote control device 200 is moved closer to the display unit 180, a selection area may be zoomed in.

Additionally, if a specific button in the remote control device 200 is pressed, recognition of a vertical or horizontal movement may be excluded. That is, if the remote control device 200 is moved away from or closer to the display unit 180, the up, down, left, or right movement may not be recognized and only the back and forth movement may be recognized. While a specific button in the remote control device 200 is not pressed, only the pointer 205 is moved according to the up, down, left or right movement of the remote control device 200.

Moreover, the moving speed or moving direction of the pointer 205 may correspond to the moving speed or moving direction of the remote control device 200.

On the other hand, the pointer in this specification means an object displayed on the display unit 180 in response to the operation of the remote control device 200. Accordingly, besides an arrow form displayed as the pointer 205 in the drawing, various forms of objects are possible. For example, the above concept includes a pointer, a cursor, a prompt, and a thick outline. The pointer 205 may be displayed in correspondence to one point of a horizontal axis and a vertical axis on the display unit 180 and also can be displayed in correspondence to a plurality of points such as a line and a surface.

Figure 5B:
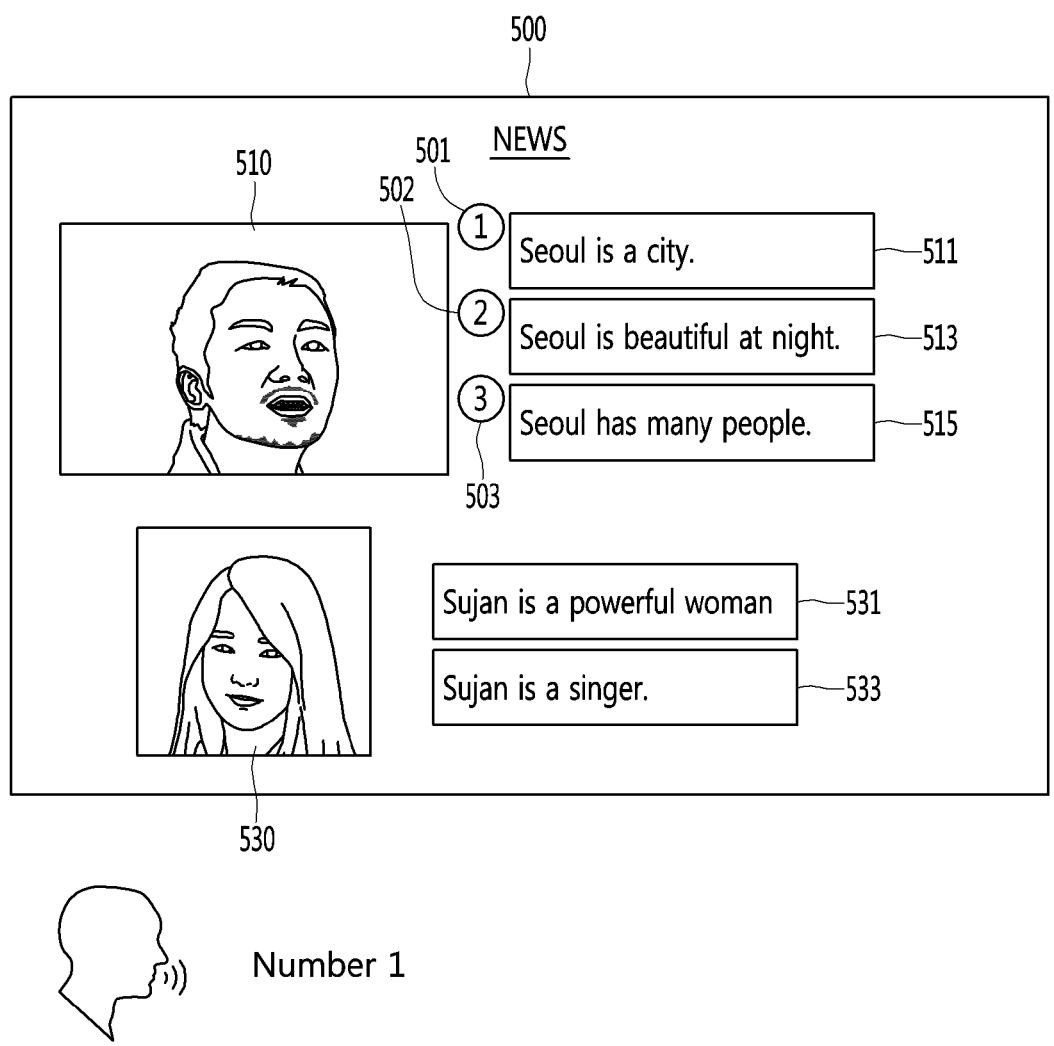

FIGS. 5A and 5*b* are views for explaining a process of opening one link through voice recognition when duplicated texts exist in a webpage according to the related art.

Referring to FIG. 5A, a webpage 500 displayed by a display device 100 is illustrated.

A first image 510, a second image 520, and a plurality of text contents 511, 513, 515, 531, and 533 are displayed on the webpage 500.

The first image 510, the second image 520, and the plurality of text contents 511, 513, 515, 531, and 533 may be items that are capable of accessing links through selection.

A number identifying existence of the link when an image is selected may be displayed on one side of the first image 510 and the second image 530.

That is, a number 1 501 may be disposed on one side of the first image 510, and a number 2 503 may be displayed on one side of the second image 530.

Also, an indicator 551 identifying that the link exists may be displayed on one side of each of the plurality of text contents 511, 513, 515, 531, and 533 in which the links exist.

The indicator 551 may have the form of a speech balloon, but this is merely an example.

When a number is also displayed on one side of each of the plurality of text contents 511, 513, 515, 531, and 533 in which the links exist, the text content may be covered due to the displayed number. Thus, the number may be displayed on only the image in which the link exists.

The user may speak about a desired item of the total of 7 items (the first and second images and the plurality of contents).

For example, when a word <seoul> is spoken, the display device 100 may recognize a spoken voice command to identify a text contact including the word <seoul>.

For example, the display device 100 may extract text contents 511, 513, and 515 including the spoken word <seoul> and having the link.

As illustrated in FIG. 5B, the display device 100 may sequentially and respectively display numbers 501, 502, and 503 on the extracted text contents 511, 513, and 515.

Thereafter, the user speaks the number corresponding to the link, to which the user intends to open, among the three numbers.

For example, if the user speaks a number 1, the display device 100 may open the webpage by selecting the text content 511 and accessing the link corresponding to the selected text content 511.

As described above, when duplicated words exist in the webpage 500, the user has to speak the word two times to open the link desired by the user.

According to an embodiment of the present disclosure, when the duplicated words exist in the webpage 500, the desired link may be quickly opened through only one speech.

This will be described.

FIG. 6 is a flowchart for explaining an operation method of the display device according to an embodiment of the present disclosure.

A display unit 180 of the display device 100 displays a webpage (S601).

It is assumed that the webpage includes duplicated words.

A control unit 170 of the display device 100 enters into a voice recognition mode according to request (S603).

In an embodiment, the control unit 170 may allow an operation mode of the display device 100 to enter into the voice recognition mode according to a signal received from a remote control device 200.

The voice recognition mode may be a mode in which a voice command of the user is recognized to perform a corresponding function.

The control unit 170 searches the duplicated words contained in the displayed webpage according to the entering into the voice recognition mode (S605).

When the display device 100 is in the voice recognition mode, the control unit 170 may extract text contents in which the links exist and then extract the duplicated words from each of the extracted text contents.

The control unit 170 sequentially displays numbers on the text contents including the searched words (S607).

In an embodiment, the control unit 170 may indicate that there is a link on one side of each of the text contents and display numbers on the display unit 180 in order of inducing the user's number speech.

The control unit 170 receives a voice command (S609) to determine whether the received voice command is a number (S611).

The control unit 170 may convert the received voice command into text data to determine whether the converted text data is a number or a character.

When the received voice command is the number, the control unit 170 displays a webpage having a link corresponding to the corresponding number on the display unit 180 (S613).

When the received voice command is the number, the control unit 170 may determine that the text content corresponding to the corresponding number is selected.

The control unit 170 may display the webpage of the connected link by accessing the link corresponding to the text content.

When the received voice command is not the number, the control unit 170 displays the webpage corresponding to the text content including a text indicating the voice command on the display unit 180 (S615).

When the received voice command is not the number but the text, the control unit 170 may determine that the text content corresponding to the corresponding text is selected.

The control unit 170 may display the webpage of the connected link by accessing the link corresponding to the selected text content.

Hereinafter, the embodiment of FIG. 6 will be described in view of actual use.

Figure 7A:
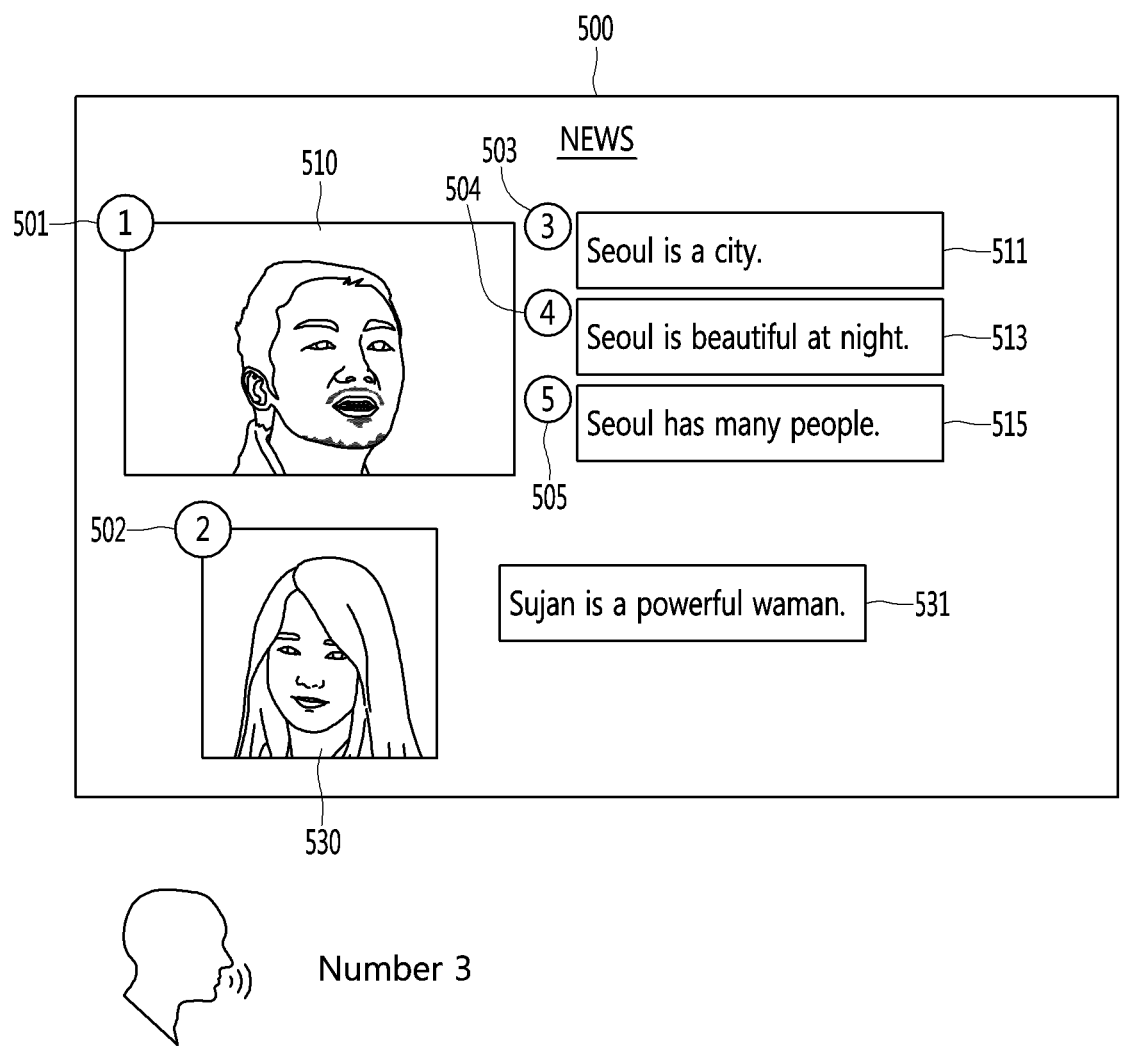
FIGS. 7A and 7B are views for explaining an example in which a connection corresponding to a text content is enabled through one speech when duplicated words exist in a webpage according to an embodiment of the present disclosure.
Figure 7B:
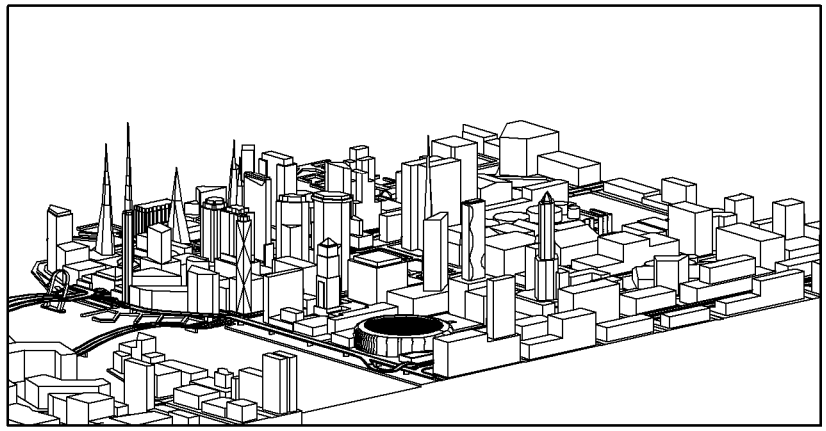

FIGS. 7A and 7B are views for explaining an example in which a connection corresponding to a text content is enabled through one speech when duplicated words exist in a webpage according to an embodiment of the present disclosure.

Referring to FIG. 7A, the display unit 180 displays a webpage 500.

When the display device 100 operates in the voice recognition mode, the control unit 170 may extract items in which links exist in the webpage 500. The control unit 170 may analyze a source code of the webpage 500 to extract the items in which the links exist.

In FIG. 7A, the items in which the links exist may include a first image 501, a second image 502, a first text content 511, a second text content 513, a third text content 515, and a fourth text content 531.

The control unit 170 may determine whether duplicate words exist from the first to fourth text contents 511, 513, 515, and 531.

Here, the duplicated words may be either nouns or proper nouns.

The control unit 170 may determine whether each of the first to third text contents 511, 513, and 515 contain a proper noun <seoul> as duplicated words.

The control unit 170 may display each of numbers 503, 504, and 505 for instructing the user's number speech on one side of each of the first to third text contents 511, 513, and 515 including the duplicated words.

When the user speaks a number 3, the control unit 170 may determine that the first text content 511 corresponding to the spoken number is selected. As illustrated in FIG. 7B, the control unit 170 may access the link of the selected text content 511 to display the webpage 700.

As described above, according to an embodiment of the present disclosure, even though the duplicated words are contained in the webpage, the user may quickly and easily open the link through one speech.

Figure 8:
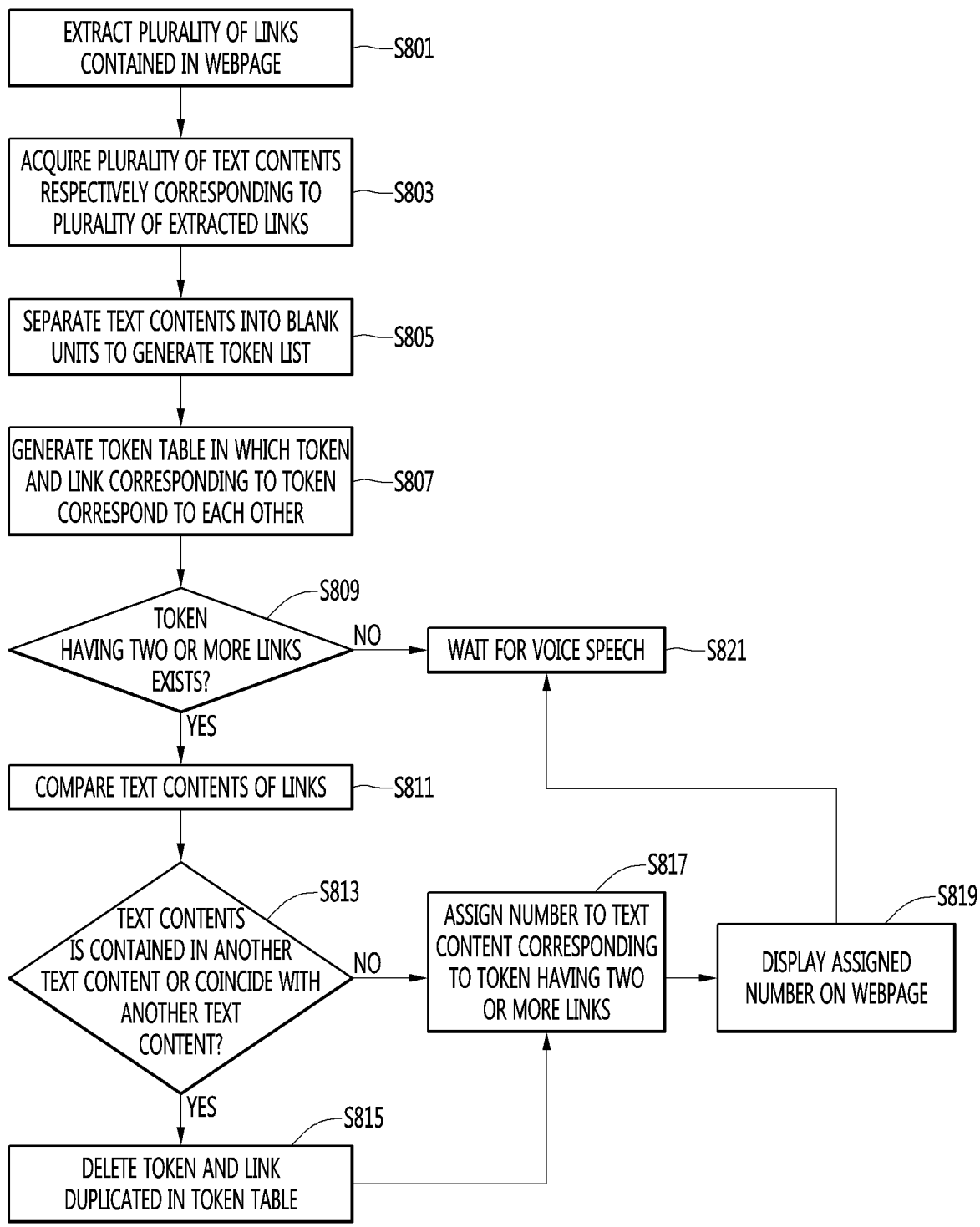
FIG. 8 is a flowchart for explaining in a detail process of extracting the duplicated words in the webpage and assigning numbers to text contents including the extracted words according to an embodiment of the present disclosure.

FIG. 8 is a flowchart for explaining in a detail process of extracting the duplicated words in the webpage and assigning numbers to text contents including the extracted words according to an embodiment of the present disclosure.

FIG. 8 is a detailed view for explaining operations S605 and S607 of FIG. 6.

In FIG. 8, it is assumed that the display device 100 operates in the voice recognition mode.

Referring to FIG. 8, the control unit 170 extracts a plurality of links contained in the webpage (S801).

Each of the links may be an access address (URL).

In an embodiment, the control unit 170 may extract only a link corresponding to a text content except for an image.

The control unit 170 acquires a plurality of text contents corresponding to the plurality of extracted links (S803).

In an embodiment, the control unit 170 may analyze a source code of the webpage to extract the plurality of links contained in the webpage. Also, the control unit 170 may extract a plurality of text contents paired with the plurality of extracted links.

The control unit 170 may divide the text contents based on blank units to generate a token list including a plurality of tokens (S805).

In an embodiment, the control unit 170 may acquire the tokens divided based on blank units in each of the text contents.

Also, the control unit 170 may acquire only a normal noun or proper noun as a final token from the acquired tokens through morphological analysis.

The control unit 170 generates a token table in which each of the plurality of tokens and the link corresponding to each token correspond to each other (S807).

In an embodiment, the token table may include tokens, access addresses corresponding to the tokens, and a corresponding relationship between text contents to be extracted as the tokens.

The generated token table may be stored in a storage unit 140.

Figures 9, 10:
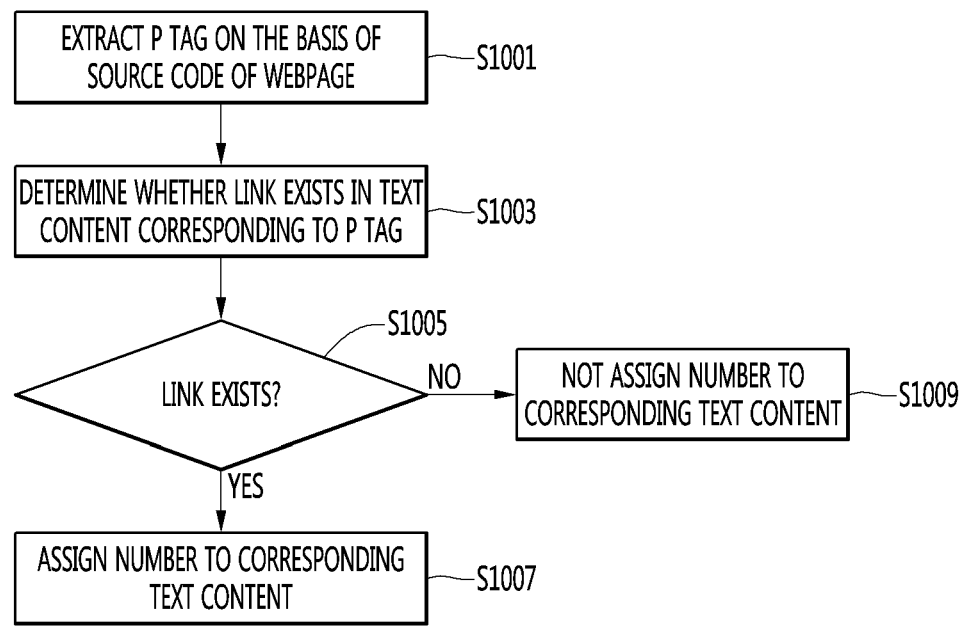
FIG. 9 is a view for explaining a token table according to an embodiment of the present disclosure.
FIG. 10 is a flowchart for explaining a process of assigning a number to a text content corresponding to a paragraph tag when a link exists in a paragraph tag of the webpage according to an embodiment of the present disclosure.

FIG. 9 is a view for explaining the token table according to an embodiment of the present disclosure.

The token table 900 according to an embodiment of the present disclosure may include tokens, access addresses (links), and a corresponding relationship between text contents corresponding to the access addresses.

For example, an access address corresponding to a token that is a word <seoul> may be <www.seoul-1.com> and <www.seoul-2.com>.

An access address corresponding to a token that is a word <Busan> may be <www.busan.com>.

FIG. 8 will be described again.

The control unit 170 determines whether tokens corresponding to two or more links exist (S809).

Since the duplicated words are contained in the webpage, this may be a case in which the two or more links correspond to one token.

For example, referring to FIG. 9, two or more links such as one <www.seoul-1.com> and two <www.seoul-2.com> may correspond to the one token that is the word <seoul>.

When the token to which the two or more links correspond exists, the control unit 170 compares text contents of the corresponding links with each other (S811).

In the comparison results, when one text content is contained in the other text content or coincides with the other text content (S813), duplicated tokens and links corresponding to the duplicated tokens in the token table are deleted (S815).

Referring to FIG. 9, there are text contents <seoul is beautiful at night> and <seoul is beautiful at night and has many places>, which correspond to the tokens having the two or more links.

When comparing the two text contents with each other, one contains the other.

The control unit 170 may delete the corresponding relationships of <seoul>, <www.seoul-2.com>, and <seoul is beautiful at night and has many places> from the token table 900.

This is done for preventing two numbers from being assigned to one text content.

When one text content is not contained or does not match another text content (S813), the control unit 170 sequentially assigns numbers to the text contents corresponding to the tokens having two or more links (S817).

Referring to FIG. 9, the control unit 170 may assign a number 1 to the text content <seoul is a city> and assign a number 2 to the text content <seoul is beautiful at night>.

The control unit 170 displays each of the assigned numbers on one side of each of the text contents contained in the webpage (S819).

This is as described in FIG. 7A.

Thereafter, in the state in which the numbers are displayed, the control unit 170 waits for user's voice speech reception (S821).

When the token to which the two or more links correspond does not exist, the control unit 170 waits for the user's voice speech reception (S821).

For example, referring to FIG. 9, since the token <busan> is not the duplicated token, no number is assigned.

FIG. 10 is a flowchart for explaining a process of assigning a number to a text content corresponding to a paragraph tag when a link exists in a paragraph tag of the webpage according to an embodiment of the present disclosure.

FIG. 10 is based on the embodiment of FIG. 6.

The control unit 170 extracts a paragraph tag (hereinafter, referred to as a "p tag") on the basis of the source code of the webpage (S1001).

In an embodiment, the p tag (paragraph tag) may be a tag indicating a paragraph.

A text content disposed between a <p> tag and </p> tag may constitute one paragraph within the source code of the webpage.

In an embodiment, the operation S1001 may be performed when an anchor tag (hereinafter, referred to as an "a tag") does not exist in the source code of the webpage.

The a tag may be a tag connecting one webpage to the other webpage. That is, the a tag may be a tag that provides a function of moving to the other webpage.

The control unit 170 may extract the p tag when the a tag does not exist in the source code of the webpage.

If the a tag exists in the source code of the webpage, a number is assigned to a text content corresponding to the a tag.

If the corresponding a and b tags exist in one text content, the control unit 170 may assign a number first to the a tag. This will be described later.

The control unit 170 determines whether a link exists in the text content corresponding to the p tag (S1003).

In an embodiment, the control unit 170 may determine whether a link exists by adding a focus event to the text content corresponding to the p tag.

In an embodiment, the focus event may be an event for locating a pointer 205 moving according to movement of the remote control device 200 on the corresponding text content.

When a state change of the text content occurs according to the focus event inputted on the text content corresponding to the p tag, the control unit 170 may determine that the link exists in the corresponding text content.

For example, the case in which the state of the text content is changed may be a case in which at least one of a color, a font, and a thickness of the text content is changed.

For another example, the case in which the state of the text content is changed may be a case in which the text content is changed to another text content.

When the link exists in the text content corresponding to the p tag (S1005), a number is assigned to the corresponding text content (S1007).

Thus, even though the a tag does not exist in the source code of the webpage, the link existing in the text content corresponding to the p tag may be determined. The user may speak the number assigned to the text content corresponding to the p tag to easily open the corresponding link event through the a tag does not exist.

According to another embodiment, when the text corresponding to the p tag is duplicated in the webpage, the control unit 170 may sequentially assign numbers to the texts.

For example, when a first text which is contained in a first text content corresponding to a first p tag and in which a link exists and a second text which is contained in a second text content corresponding to a second p tag and in which a link exists are duplicated with each other, numbers may be sequentially assigned to the first and second texts.

Thereafter, as described in the operation S821 of FIG. 8, the control unit 170 waits for user's voice speech.

When the link does not exist in the text content corresponding to the p tag (S1005), a number is not assigned to the corresponding text content (S1009).

Thereafter, as described in the operation S821 of FIG. 8, the control unit 170 waits for the user's voice speech.

Hereinafter, the embodiment of FIG. 10 will be described with a specific example.

Figure 11B:
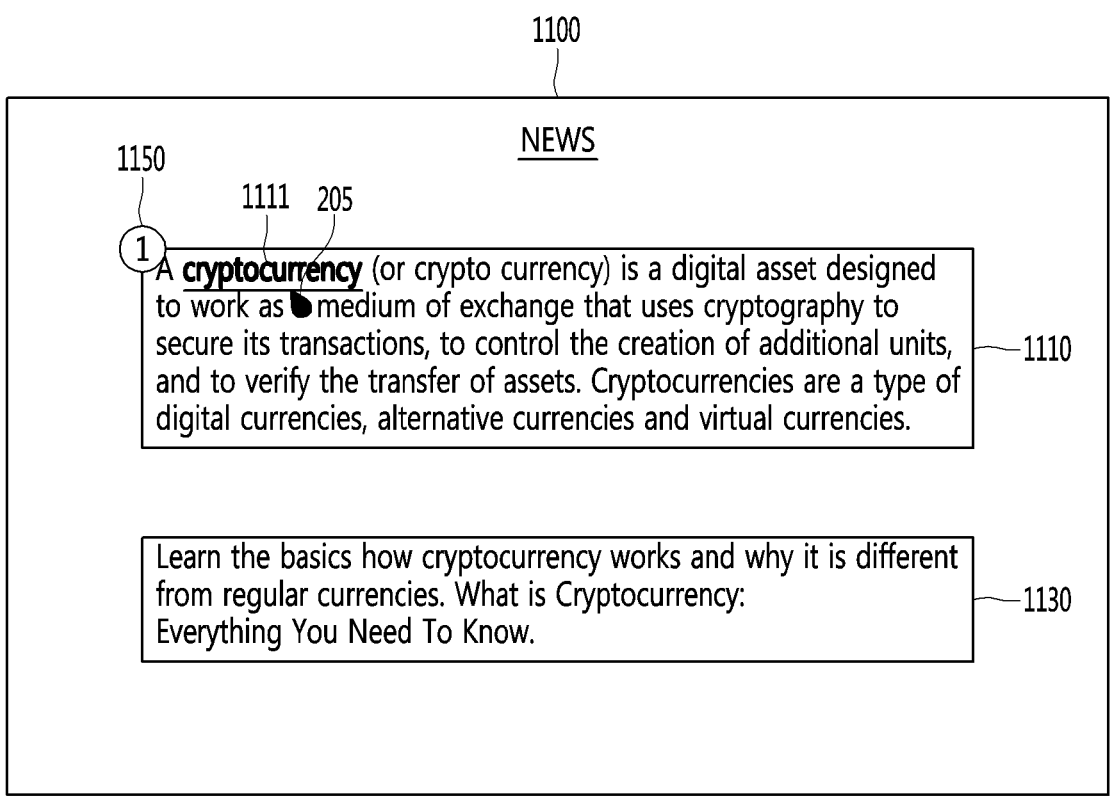

FIGS. 11A and 11B are views for explaining an example of assigning a number to a text content corresponding to a paragraph tag when there is no anchor tag in a source code of a webpage, and only a paragraph tag exists according to an embodiment of the present disclosure.

Referring to FIG. 11A, the display unit 180 displays a webpage 1100.

Also, in FIGS. 11A and 11B, it is assumed that the display device operates in the voice recognition mode.

Also, in FIGS. 11A and 11B, it is assumed that a first p tag corresponding to a first text content 1110 and a second p tag corresponding to a second text content 1130 exist in the source code.

The control unit 170 may analyze a source code of the webpage 1100 to determine whether the a tag including the link exists.

When the a tag does not exist, the control unit 170 determines whether the p tag exists.

The control unit 170 may determine that the first p tag and the second p tag exist in the source code and input a focus event to each of the first text content 1110 corresponding to the first p tag and the second text content 1130 corresponding to the second p tag.

For example, the control unit 170 may locate a pointer (not shown) on the first text content 1110.

The control unit 170 may determine whether a change in state of the first text content 1110 occurs according to the position of the pointer 205. The control unit 170 may move the pointer 205 for each text line constituting the first text content 1110 to determine whether a change occurs on the first text content 1110.

For example, as illustrated in FIG. 11B, when a thickness of a text 1111 contained in the first text content 1110 is changed, the control unit 170 may determine that a state change occurs on the first text content 1110.

When it is determined that the state change occurs on the text 1111 of the first text content 1110, the control unit 170 may determine that the link exists in the text 1111.

Thus, the control unit 170 may display a number 1150 for inducing voice speech to one side of the text 1111.

As described above, according to an embodiment of the present disclosure, even though the source code of the webpage does not include an anchor tag, the paragraph tag may be analyzed to assign a number to the corresponding text when the link exists.

Thus, the link contained in the webpage may not be missing, and the user may easily access the link by speaking the number of the corresponding link.

When the anchor tag and the paragraph tag simultaneously correspond to one text content, the control unit 170 may perform numbering first on the anchor tag. This is because when the numbering is performed for each of the anchor tag and the paragraph tag, the text content is covered.

Figure 12A:
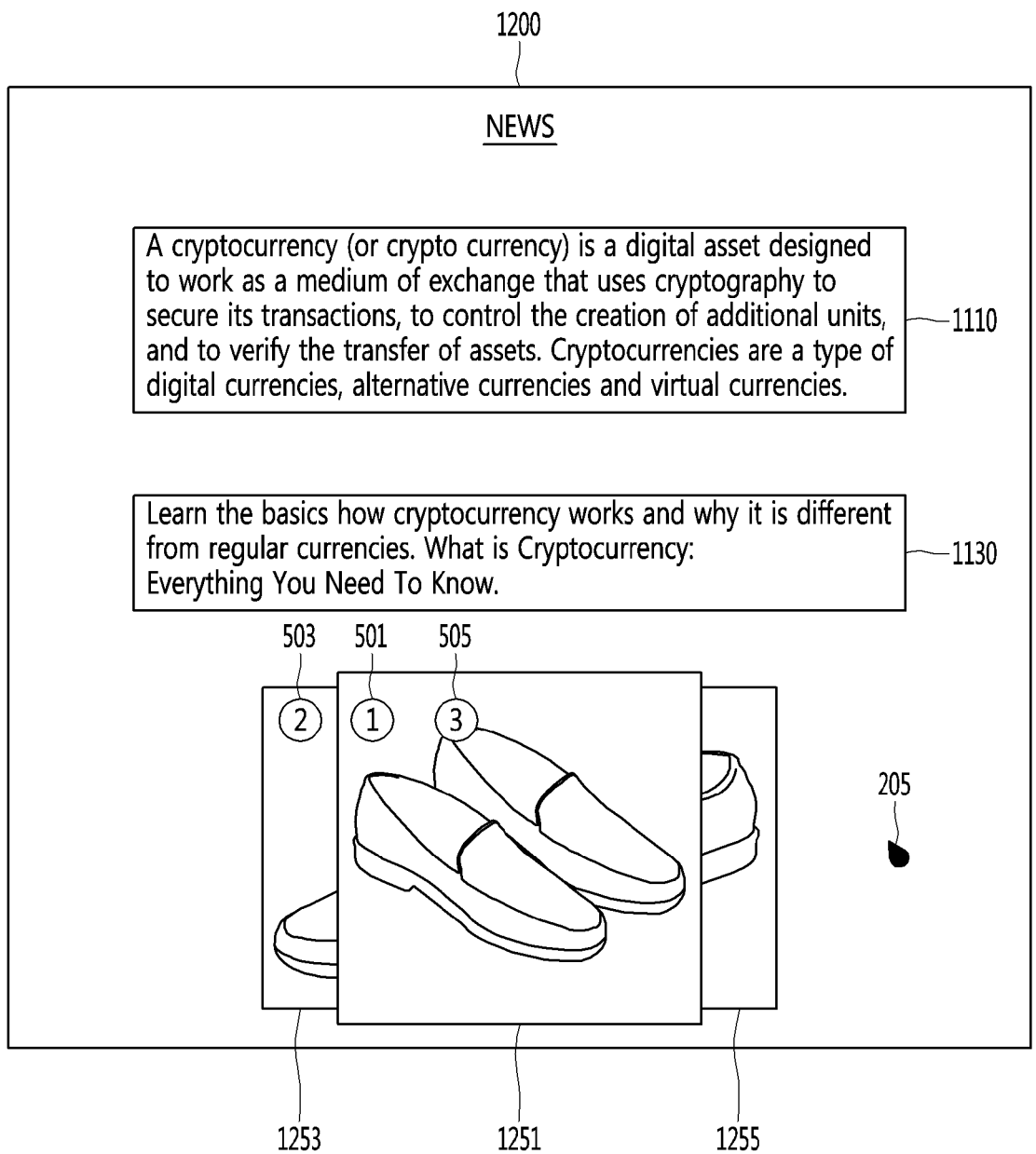
FIGS. 12A and 12B are views for explaining an example in which a hidden advertisement image is recognized and not numbered when the hidden advertisement image exists in a webpage according to an embodiment of the present disclosure.
Figure 12B:
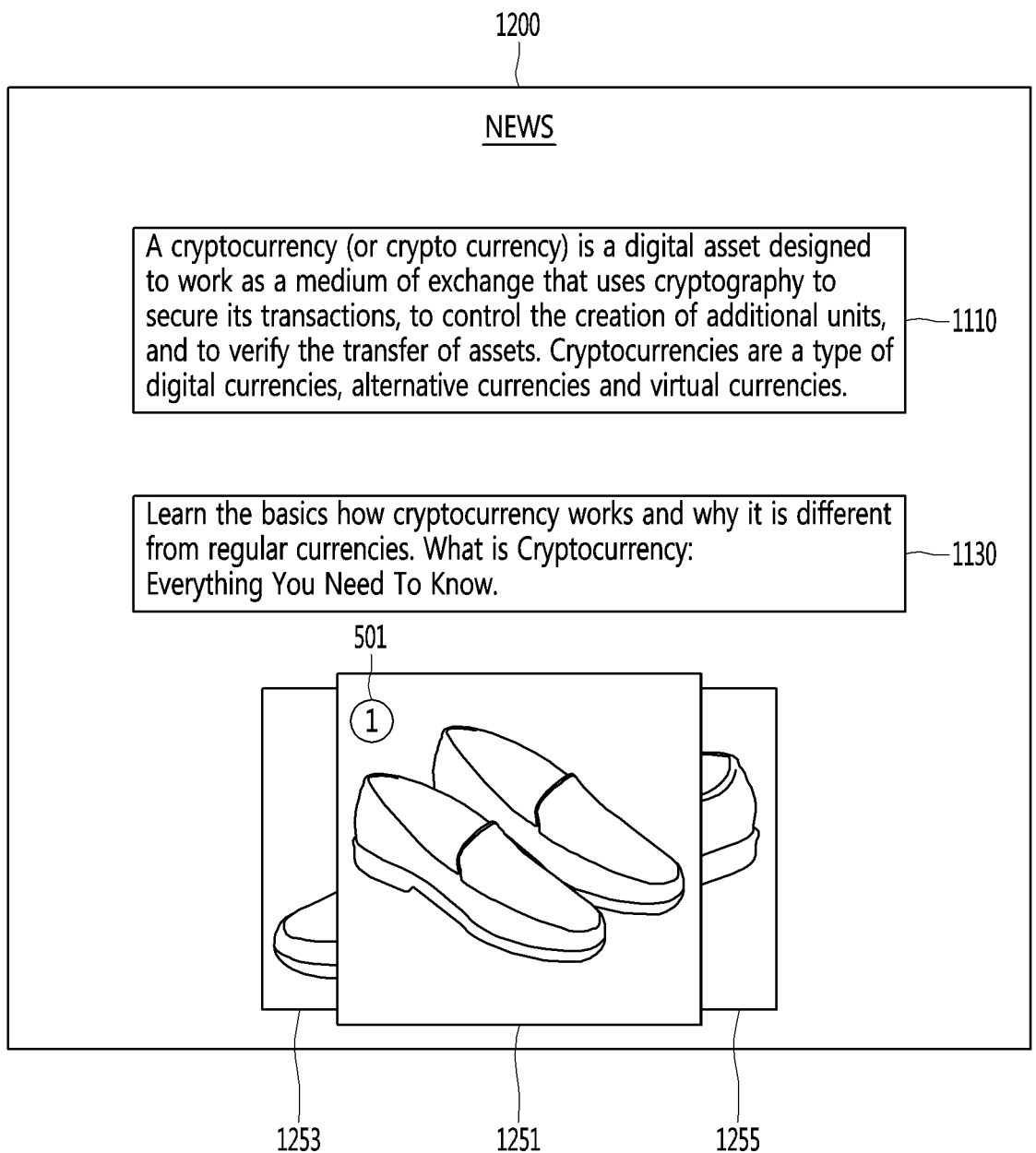

FIGS. 12A and 12B are views for explaining an example in which a hidden advertisement image is recognized and not numbered when the hidden advertisement image exists in a webpage according to an embodiment of the present disclosure.

Referring to FIG. 12A, a webpage 1200 may include a first advertisement image 1251, a second advertisement image 1253, and a third advertisement image 1255.

Also, the second advertisement image 1253 and the third advertisement image 1255 are covered by the first advertisement image 1251.

According to the related art, when the control unit 170 analyzes a source code in the webpage 1200 to determine that a link corresponding to each of the first advertisement image 1251, the second advertisement image 1253, and the third advertisement image 1255 exists (when it is determined that an anchor tag exists), numbers 501 to 505 are displayed on sides of the first advertisement image 1251, the second advertisement image 1253, and the third advertisement image 1255, respectively.

However, in this case, a plurality of numbers are displayed on the first advertisement image 1251. In the case in which the user desires to select the first advertisement image 1251, there is a confusing problem in which the user does not know any number to be spoken.

Thus, according to an embodiment, when the advertisement images overlap each other, the numbering may not be performed for the hidden advertisement images.

For example, the control unit 170 may input a focus event to the first advertisement image 1251. The focus event may be an event for locating a pointer 205 on the first advertisement image 151.

When the plurality of numbers are to be displayed on the first advertisement image 1251 according to the focus event, the control unit 170 may not display the numbers other than the most advanced number.

That is, as illustrated in FIG. 12B, the control unit 170 may leave a number one 501 that is the most advanced number but delete the numbers other than the number one.

Thus, the user may not be confused by the number being spoken by the hidden advertisement image.

Figure 13A:
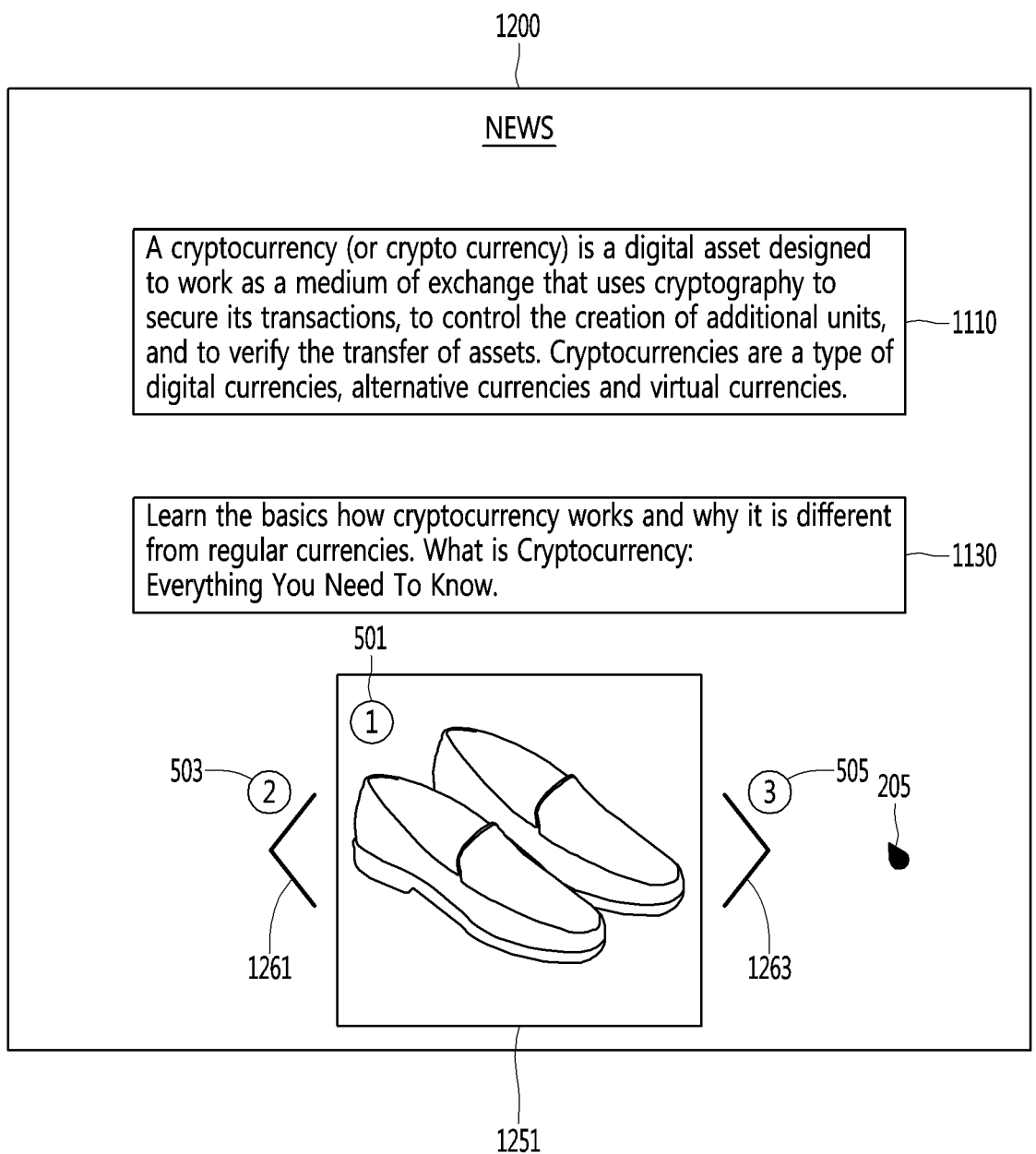
FIGS. 13A and 13B are views for explaining an example of assigning a number to a direction key when the direction key is provided in a webpage according to an embodiment of the present disclosure.
Figure 13B:
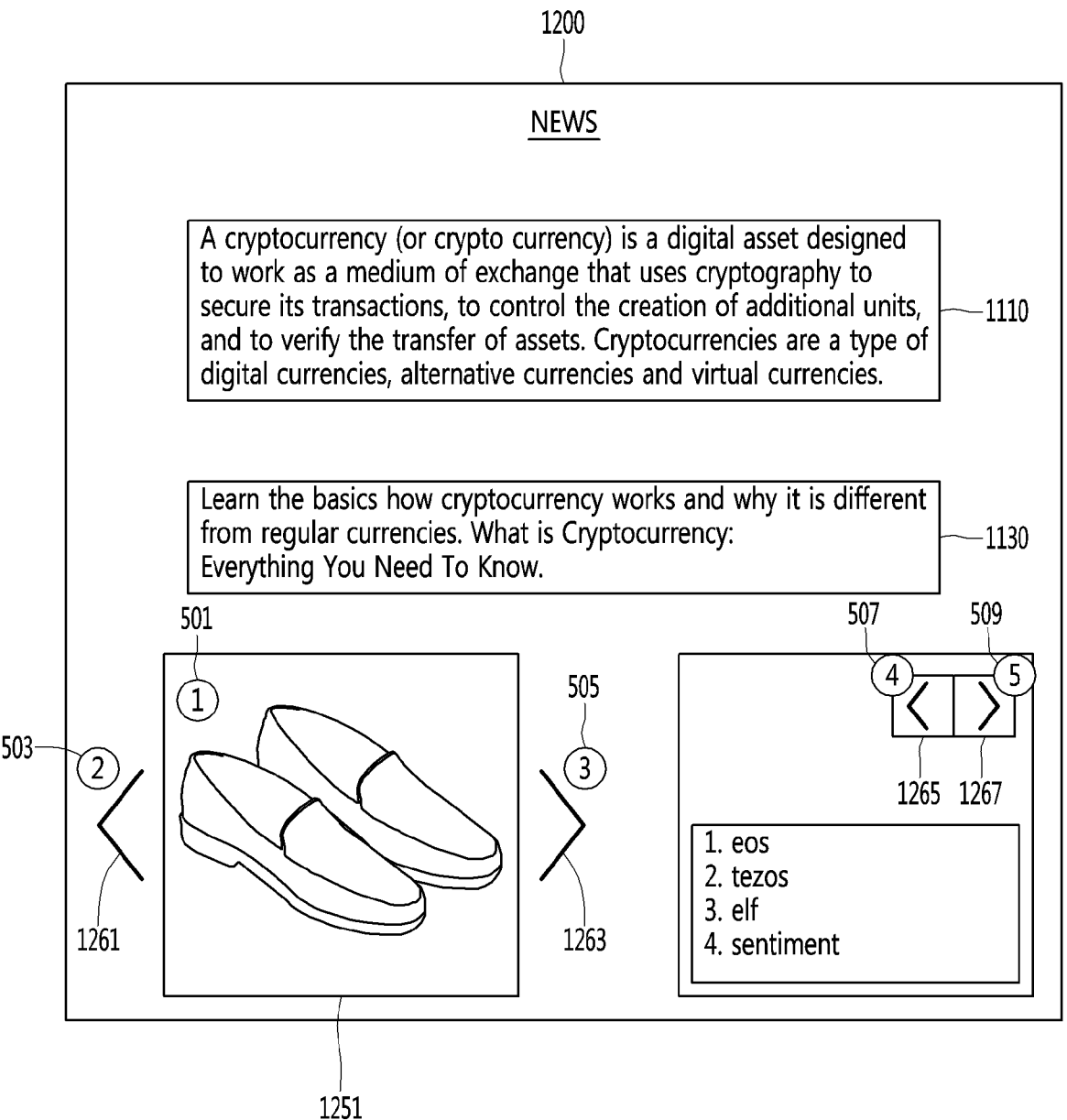

FIGS. 13A and 13B are views for explaining an example of assigning a number to a direction key when the direction key is provided in a webpage according to an embodiment of the present disclosure.

Referring to FIG. 13A, a webpage 1200 may include an advertisement image 1251, a first left direction key 1261, and a first right direction key 1263.

When the control unit 170 may analyze a source code of the webpage 1200 to determine that an anchor tag exists in each of the advertisement image 1251, the first left direction key 1261, and the first right direction key 1263, numbers 501 to 505 may be displayed on sides of the advertisement image 1251, the first left direction key 1261, and the first right direction key 1263, respectively.

In an embodiment, a case in which an anchor tag exists in each of the first left direction key 1261 and the first right direction key 1263 may be a case in which there is an image hidden by the direction key, and a link exists in the corresponding image.

In the case of the numbers 503 and 505 displayed on the sides of the first left direction key 1261 and the first right direction key 1263, when there is the link but not text or an image, the control unit 170 may perform numbering on the corresponding direction key.

According to an embodiment of the present disclosure, the control unit 170 may input a focus event to the direction key to assign a number to the corresponding direction key when a direction change occurs in the direction key.

In an embodiment, the case in which the state change occurs in the direction key may be a case in which the text is displayed on one side of the direction key, or a thickness or size of the direction key is changed.

When the state change occurs in the direction key according to the focus event for the direction key, the control unit

170 may determine that the link exists in the direction key and assign a number to the direction key.

The embodiment of FIG. 13B is a case in which a plurality of direction keys exist.

That is, when compared to FIG. 13A, a case in which an additional second left direction key 1265 and second right direction key 1267 exist in the webpage 1200 will be described.

The display device 100 may respectively assign numbers to the direction keys to give a direction key option to the user when there are a plurality of direction key sets.

Referring to FIG. 13B, in addition to the first left direction key 1261 and the first right direction key 1263, numbers 507 to 509 may be assigned to the second left direction key 507 and the second right direction key 1267, respectively.

Similarly, the control unit 170 may input a focus event to each of direction keys to determine whether a link exists by determining whether a state change with respect to each of the direction keys occurs before assigning the numbers.

As described above, the user may also assign a number to a direction key existing in a webpage to improve user's experience with respect to voice recognition.

According to further another embodiment of the present disclosure, all the links existing in the webpage may be numbered to quickly access the link through a number button (not shown) provided in the remote control device 200.

When the display device 100 is in a voice recognition mode, and a four-way key (not shown) provided in the remote control device 200 is pressed, the control unit 170 assigns numbers to all links existing in the webpage to display the assigned numbers.

When receiving a signal for selecting a specific number from the remote control device 200, the control unit 170 may open a link corresponding to the selected number.

According to further another embodiment of the present disclosure, the user may open the link on the webpage by pushing and inputting the number button provided on the remote control device 200 as well as the voice recognition.

For example, the display device 100 may display a number on each of all links existing in the webpage when any one of the four directional keys provided is the remote control device 200 is selected.

Thereafter, the user may input the number corresponding to the link, which is intended to open, through the number buttons of the remote control device 200.

The display device 100 may access the link corresponding to the number according to a numeric key input signal received from the remote control device 200.

In a case of a general remote controller which does not support the movement of the pointer, when any one of the four direction keys provided in the remote controller is selected, a pointer may be displayed. The user may select the desired link while continuously pressing the displayed pointer.

However, in this case, it is inconvenient for the user to select the link by moving the pointer with the four-way key, and also, it is difficult to select the link.

Thus, according to an embodiment of the present disclosure, when any one of the four direction keys provided in the remote controller is selected, the display device 100 may recognize the selected direction key to display numbers on all the links existing on the webpage.

Thus, when the webpage is displayed, the problem occurring because too many numbers are displayed may be solved, and the user may easily open the links through the numeric key input.

The present invention mentioned in the foregoing description may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the control unit 170 of the mobile terminal.

The foregoing embodiments are merely exemplary and are not to be considered as limiting the present disclosure. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

According to the various embodiments of the present disclosure, even though the duplicated texts exist in the webpage, the user may quickly and easily access the webpage through only one voice recognition.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A display device comprising:
   a display; and
   a controller operably coupled with the display and configured to:
   cause the display to display a webpage including a plurality of text contents, each of the plurality of text contents being selectable to access a corresponding link;
   divide the plurality of text contents based on blank units to generate a plurality of tokens and a token table in which at least one link and a corresponding one of the plurality of tokens are associated;
   assign a number to a text content corresponding to a token having two or more links based on the generated token table,
   wherein no number is assigned to a text content corresponding to a token having less than two links;
   enter a voice recognition mode; and
   based on entering the voice recognition mode, search for duplicate words included in the plurality of text contents; and
   based on the search identifying that a specific noun is included in each text content of a subset of the plurality of text contents:
   cause the display to display sequential numbers at a side of each text content of the subset of the plurality of text contents;
   receive a voice command;
   based on determining that the voice command identifies one of the displayed sequential numbers, access the link corresponding to the text content corresponding to the identified one of the displayed sequential numbers,
wherein the link corresponding to the text content corresponding to the identified one of the displayed sequential numbers is accessed without requiring earlier reception of another voice command that identifies the specific noun; and
based on determining that the voice command identifies one of the plurality of text contents and not one of the displayed sequential numbers, access the link corresponding to the identified one of the plurality of text contents.

2. The display device according to claim 1, wherein the controller is further configured to:
compare text contents corresponding to the token having the two or more links with each other; and
delete a correspondence relationship of the token and a link corresponding to the token from the token table, wherein the link corresponding to the token is same as one of the two or more links.

3. The display device according to claim 1, wherein the controller is further configured to:
extract a paragraph tag indicating a paragraph when an anchor tag for opening another webpage is not extracted;
determine whether a link exists from the extracted paragraph tag; and
assign a number to a text content corresponding to the paragraph tag based on determining that the link exists.

4. The display device according to claim 3, wherein the controller is further configured to determine whether a state change of the text content corresponding to the paragraph tag occurs in response to an input focus event to the text content.

5. The display device according to claim 4, wherein the focus event corresponds to positioning a pointer on the text content corresponding to the paragraph tag, wherein the pointer is controlled according to movement of a remote control device.

6. The display device according to claim 5, wherein the controller is further configured to determine that a link exists in the text content when the state change occurs in response to the focus event.

7. The display device according to claim 6, wherein the state change includes a change in a displayed size of the text content or a display of another text content.

8. The display device according to claim 6, wherein the controller is further configured to cause the display to display other numbers other than the displayed sequential numbers when an image corresponding to the link exists in the webpage.

9. The display device according to claim 8, wherein the controller is further configured to, when a plurality of overlapping images corresponding to the link exist in the webpage, cause the display to display a number only on a non-hidden image of the plurality of overlapping images.

10. The display device according to claim 1, wherein the controller is further configured to assign a number to a direction key in the webpage which is associated with a link.

11. The display device according to claim 1, wherein each of the plurality of text contents respectively corresponds to the corresponding link extracted based on a source code of the webpage.

* * * * *